US011295501B1

(12) United States Patent
Biswas et al.

(10) Patent No.: US 11,295,501 B1
(45) Date of Patent: Apr. 5, 2022

(54) METHOD AND SYSTEM FOR GENERATING FACE ANIMATIONS FROM SPEECH SIGNAL INPUT

(71) Applicant: Tata Consultancy Services Limited, Mumbai (IN)

(72) Inventors: Sandika Biswas, Kolkata (IN); Dipanjan Das, Kolkata (IN); Sanjana Sinha, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/188,512

(22) Filed: Mar. 1, 2021

(30) Foreign Application Priority Data

Nov. 4, 2020 (IN) .............................. 202021048222

(51) Int. Cl.
| | |
|---|---|
| *G06T 13/20* | (2011.01) |
| *G10L 25/24* | (2013.01) |
| *G06T 13/40* | (2011.01) |

(52) U.S. Cl.
CPC ............ *G06T 13/205* (2013.01); *G06T 13/40* (2013.01); *G10L 25/24* (2013.01)

(58) Field of Classification Search
CPC ........ G06T 13/205; G06T 13/40; G10L 25/24
See application file for complete search history.

(56) References Cited

U.S. PATENT DOCUMENTS

| 6,735,566 | B1 * | 5/2004 | Brand ................. G06K 9/6297 |
| | | | 345/473 |
| 10,360,716 | B1 * | 7/2019 | van der Meulen ..... G06T 13/40 |
| 10,521,946 | B1 * | 12/2019 | Roche ..................... G06T 13/40 |
| 10,586,369 | B1 * | 3/2020 | Roche ..................... G10L 15/26 |
| 10,621,771 | B2 * | 4/2020 | Matts ...................... G06F 17/12 |

(Continued)

OTHER PUBLICATIONS

Author: Carlos Busso, Zhigang Deng, Michael Grimm, Ulrich Neumann, and Shrikanth Narayanan Title: Rigid Head Motion in Expressive Speech Animation: Analysis and Synthesis Title of the item: IEEE Transactions on Audio, Speech, and Language Processing Date: Mar. 2007 vol. 15, Issue: 3 pp. 1075-1086 Publisher: IEEE Link: https://sail.usc.edu/publications/files/bussotaslp2007%5B2%5D.pdf.

(Continued)

*Primary Examiner* — David T Welch
(74) *Attorney, Agent, or Firm* — Finnegan, Henderson, Farabow, Garrett & Dunner, LLP

(57) ABSTRACT

Most of the prior art references that generate animations fail to determine and consider head movement data. The prior art references which consider the head movement data for generating the animations rely on a sample video to generate/determine the head movements data, which, as a result, fail to capture changing head motions throughout course of a speech given by a subject in an actual whole length video. The disclosure herein generally relates to generating facial animations, and, more particularly, to a method and system for generating the facial animations from speech signal of a subject. The system determines the head movement, lip movements, and eyeball movements, of the subject, by processing a speech signal collected as input, and uses the head movement, lip movements, and eyeball movements, to generate an animation.

9 Claims, 8 Drawing Sheets

(56) References Cited

U.S. PATENT DOCUMENTS

| | | | |
|---|---|---|---|
| 10,628,666 B2* | 4/2020 | Sareen | G06K 9/00369 |
| 10,628,729 B2* | 4/2020 | Sareen | G06N 3/006 |
| 2008/0269958 A1* | 10/2008 | Filev | A61B 5/18 |
| | | | 701/1 |
| 2012/0130717 A1* | 5/2012 | Xu | H04L 51/10 |
| | | | 704/258 |
| 2013/0257877 A1* | 10/2013 | Davis | G06N 3/006 |
| | | | 345/473 |
| 2017/0011745 A1* | 1/2017 | Navaratnam | G06Q 30/016 |
| 2017/0154457 A1* | 6/2017 | Theobald | G06T 13/205 |
| 2017/0213076 A1* | 7/2017 | Francisco | G06K 9/00228 |
| 2018/0137678 A1* | 5/2018 | Kaehler | G02B 27/017 |
| 2019/0279410 A1* | 9/2019 | Orvalho | G06F 3/013 |
| 2019/0285881 A1* | 9/2019 | Ilic | G06T 17/00 |
| 2019/0325633 A1* | 10/2019 | Miller, IV | G06F 3/04847 |
| 2020/0126283 A1* | 4/2020 | van Vuuren | G10L 13/00 |
| 2020/0302667 A1* | 9/2020 | del Val Santos | G06N 3/0472 |
| 2021/0012549 A1* | 1/2021 | Comer | G06K 9/00288 |
| 2021/0104100 A1* | 4/2021 | Whitney | G06F 3/013 |
| 2021/0192824 A1* | 6/2021 | Chen | G06T 13/40 |

OTHER PUBLICATIONS

Author: Ran Yi, Zipeng Ye, Juyong Zhang, Hujun Bao, and Yong-Jin Liu Title: Audio-driven Talking Face Video Generation with Learning-based Personalized Head Pose Title of the item: Computer Vision and Pattern Recognition—Graphics Date: Feb. 2020 Publisher: Arxiv Link: https://arxiv.org/pdf/2002.10137.pdf.

* cited by examiner

METHOD AND SYSTEM FOR GENERATING FACE ANIMATIONS FROM SPEECH SIGNAL INPUT

PRIORITY CLAIM

This U.S. patent application claims priority under 35 U.S.C. § 119 to: India Application No. 202021048222, filed on Nov. 4, 2020. The entire contents of the aforementioned application are incorporated herein by reference.

TECHNICAL FIELD

This disclosure relates generally to generating facial animations, and more particularly to a method and system for generating the facial animations from speech signal of a subject.

BACKGROUND

Animation is the process of manipulating figures as moving objects. Cartoons, animation movies and so on are very popular areas where the animation is typically applied. It is also possible to generate animated versions of videos. When an animated character corresponding to a real-life character (referred to as "subject") in a video is generated, one main requirement is that their appearance, expressions and so on are in sync with that of the subject. For example, consider that the original video is that of a politician delivering a speech. While animating this video, it is important that the appearance of animated character matches the that of the subject, and the expressions while delivering the speech also match that of the subject. Speech driven animation is another type of animation, in which the animation is generated by processing speech signal collected as input. Systems that perform the speech driven animation are capable of capturing relationship between speech and gestures, and then generates the animation.

The inventors here have recognized several technical problems with such conventional systems, as explained below. Typically while delivering the speech (or even when casually talking), movement of the subject's lips, eyes, and head can be observed. While animating the subject, the lip movements, eye movements, head movements and so on need to be captured. Some of the state-of-the-art systems in the field of animation fail to capture the head movements. Some other existing systems capture the head movements, but by learning from a sample video clip, which in some cases should be a part of the original video being animated. Disadvantage of this approach is that the sample video being analyzed fail to capture all the head movements of the subject that may vary based on the changes in way of talking of the subject. For example, consider that the original video is of 60 minutes length. The sample video may be of 5 minutes length, which is a small portion of the original video. By determining the head motion from the small portion, fails to produce meaningful and coherent head motions for the rest of the speech input and produces similar kind of head motions irrespective of speech.

SUMMARY

Embodiments of the present disclosure present technological improvements as solutions to one or more of the above-mentioned technical problems recognized by the inventors in conventional systems. For example, in one embodiment, a method of generating facial animations is provided. In this method, a speech signal is received from a subject as input, via one or more hardware processors. From the speech signal, a plurality of 2-Dimensional (2D) canonical facial landmarks are generated using a data model, via the one or more hardware processors, wherein the 2D facial landmarks are pertaining to facial movement data of the subject, wherein the facial movement data comprising lip synchronization with input speech signal, natural eye blinks, and eye brow movement. Further, a plurality of 3-Dimensional (3D) canonical facial landmarks are generated by converting the plurality of 2D facial landmarks, using a plurality of camera parameters computed from a plurality of 2D-3D canonical landmarks correspondences, via the one or more hardware processors. Further, a plurality of subject-specific 3D landmarks are extracted from a target identity image of the subject, via the one or more hardware processors. The plurality of 3D canonical facial landmarks are then retargeted to the subject-specific 3D landmarks via the one or more hardware processors, to generate a plurality of facial motion-induced subject-specific frontal 3D landmarks. Further, head movement data pertaining to the subject is generated from the speech signal, using the data model, via the one or more hardware processors, using the following method. To generate the head movement data, Mel-frequency cepstral coefficients (MFCC) features are extracted for each of a plurality of audio windows of the speech signal corresponding to each of a plurality of video frames. Then an attention score is determined for each of the plurality of audio windows. Further, a sequence of rotation and translation parameters with respect to a frontal 3D canonical face is determined, for each of the plurality of audio windows in which the determined attention score is exceeding a threshold of attention score, using the plurality of MFCC features, wherein the sequence of rotation and translation parameters form a head pose of the subject. Further, a sequence of subject-specific 3D landmarks induced with head motion is generated by applying the determined sequence of rotation and translation parameters with respect to the frontal 3D canonical face, on the facial motion-induced subject-specific frontal 3D landmarks, for each of the plurality of video frames. The rotated and translated 3D motion-induced subject-specific landmarks are then projected to 2D motion-induced subject-specific landmarks via the one or more hardware processors, using the camera parameters computed from the correspondences between 2D-3D person specific facial landmarks extracted from the input target identity image. Further, the 2D motion-induced subject-specific landmarks are encoded to a latent vector, via the one or more hardware processors, and then the latent vector is decoded to generate a image face with motion, via the one or more hardware processors.

In another aspect, A system for generating facial animations is provided. The system includes a memory storing instructions, one or more communication interfaces, and one or more hardware processors coupled to the memory via the one or more communication interfaces. The one or more hardware processors are configured by the instructions to execute the following method to generate the animations. The system initially receives a speech signal from a subject as input. From the speech signal, a plurality of 2-Dimensional (2D) canonical facial landmarks are generated using a data model, via the one or more hardware processors, wherein the 2D facial landmarks are pertaining to facial movement data of the subject, wherein the facial movement data comprising lip synchronization with input speech signal, natural eye blinks, and eye brow movement. Further, a plurality of 3-Dimensional (3D) canonical facial landmarks are generated by converting the plurality of 2D facial landmarks, using a plurality of camera parameters computed from a plurality of 2D-3D canonical landmarks correspondences, via the one or more hardware processors. Further, a plurality of subject-specific 3D landmarks are extracted from a target identity image of the subject, via the one or more hardware processors. The plurality of 3D canonical facial landmarks are then retargeted to the subject-specific 3D landmarks via the one or more hardware processors, to generate a plurality of facial motion-induced subject-specific frontal 3D landmarks. Further, head movement data pertaining to the subject is generated from the speech signal, using the data model, via the one or more hardware processors, using the following method. To generate the head movement data, Mel-frequency cepstral coefficients (MFCC) features are extracted for each of a plurality of audio windows of the speech signal corresponding to each of a plurality of video frames. Then an attention score is determined for each of the plurality of audio windows. Further, a sequence of rotation and translation parameters with respect to a frontal 3D canonical face is determined, for each of the plurality of audio windows in which the determined attention score is exceeding a threshold of attention score, using the plurality of MFCC features, wherein the sequence of rotation and translation parameters form a head pose of the subject. Further, a sequence of subject-specific 3D landmarks induced with head motion is generated by applying the determined sequence of rotation and translation parameters with respect to the frontal 3D canonical face, on the facial motion-induced subject-specific frontal 3D landmarks, for each of the plurality of video frames. The rotated and translated 3D motion-induced subject-specific landmarks are then projected to 2D motion-induced subject-specific landmarks via the one or more hardware processors, using the camera parameters computed from the correspondences between 2D-3D person specific facial landmarks extracted from the input target identity image. Further, the 2D motion-induced subject-specific landmarks are encoded to a latent vector, via the one or more hardware processors, and then the latent vector is decoded to generate a image face with motion, via the one or more hardware processors.

In yet another aspect, a non-transitory computer readable medium for generating facial animations is provided. The non-transitory computer readable medium comprises of a plurality of instructions, which when executed, cause one or more hardware processors to perform the following method to generate the animation. In this method, a speech signal is received from a subject as input, via one or more hardware processors. From the speech signal, a plurality of 2-Dimensional (2D) canonical facial landmarks are generated using a data model, via the one or more hardware processors, wherein the 2D facial landmarks are pertaining to facial movement data of the subject, wherein the facial movement data comprising lip synchronization with input speech signal, natural eye blinks, and eye brow movement. Further, a plurality of 3-Dimensional (3D) canonical facial landmarks are generated by converting the plurality of 2D facial landmarks, using a plurality of camera parameters computed from a plurality of 2D-3D canonical landmarks correspondences, via the one or more hardware processors. Further, a plurality of subject-specific 3D landmarks are extracted from a target identity image of the subject, via the one or more hardware processors. The plurality of 3D canonical facial landmarks are then retargeted to the subject-specific 3D landmarks via the one or more hardware processors, to generate a plurality of facial motion-induced subject-specific frontal 3D landmarks. Further, head movement data pertaining to the subject is generated from the speech signal, using the data model, via the one or more hardware processors, using the following method. To generate the head movement data, Mel-frequency cepstral coefficients (MFCC) features are extracted for each of a plurality of audio windows of the speech signal corresponding to each of a plurality of video frames. Then an attention score is determined for each of the plurality of audio windows. Further, a sequence of rotation and translation parameters with respect to a frontal 3D canonical face is determined, for each of the plurality of audio windows in which the determined attention score is exceeding a threshold of attention score, using the plurality of MFCC features, wherein the sequence of rotation and translation parameters form a head pose of the subject. Further, a sequence of subject-specific 3D landmarks induced with head motion is generated by applying the determined sequence of rotation and translation parameters with respect to the frontal 3D canonical face, on the facial motion-induced subject-specific frontal 3D landmarks, for each of the plurality of video frames. The rotated and translated 3D motion-induced subject-specific landmarks are then projected to 2D motion-induced subject-specific landmarks via the one or more hardware processors, using the camera parameters computed from the correspondences between 2D-3D person specific facial landmarks extracted from the input target identity image. Further, the 2D motion-induced subject-specific landmarks are encoded to a latent vector, via the one or more hardware processors, and then the latent vector is decoded to generate a image face with motion, via the one or more hardware processors.

It is to be understood that both the foregoing general description and the following detailed description are exemplary and explanatory only and are not restrictive of the invention, as claimed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
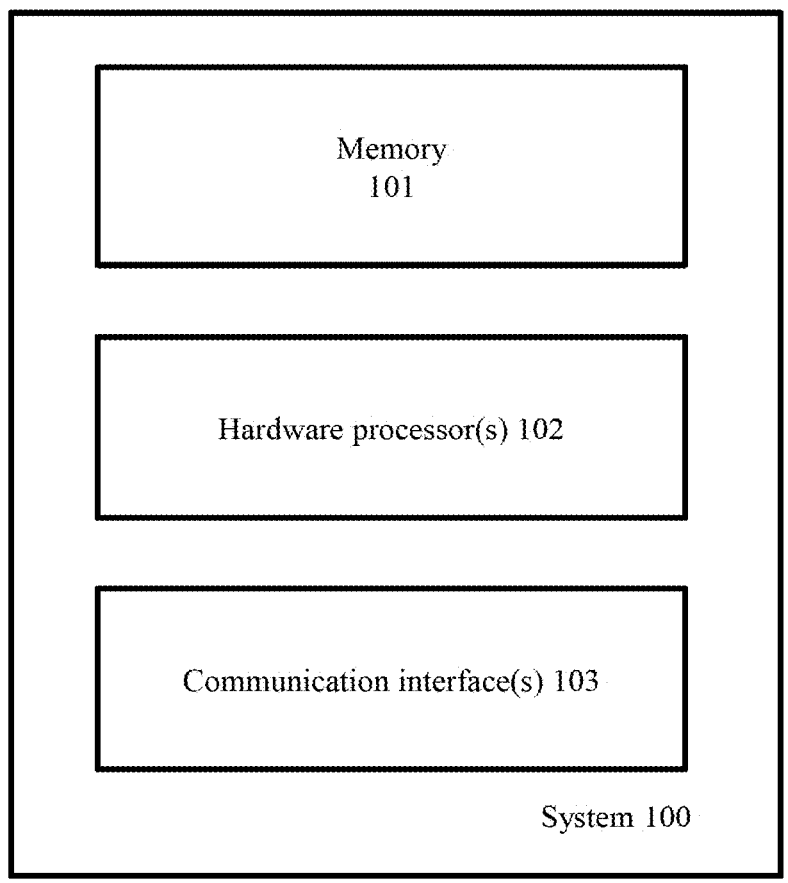
FIG. 1 illustrates an exemplary system for generating animations using speech signal of a subject, according to some embodiments of the present disclosure.

FIG. 1 illustrates an exemplary system for generating animations using speech signal of a subject, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

Figure 2:
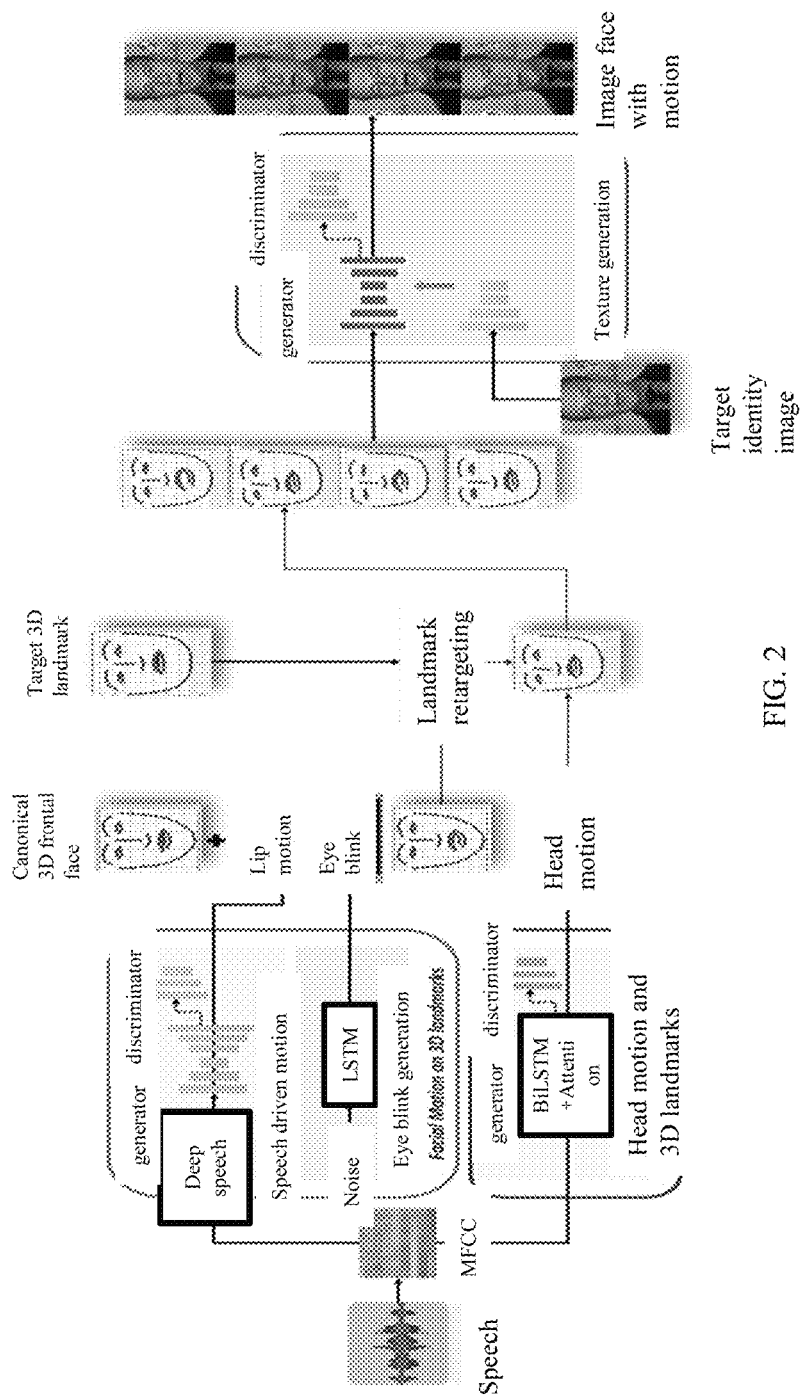
FIG. 2 is a block diagram depicting functional implementation of the system of FIG. 1, according to some embodiments of the present disclosure.
Figure 3:
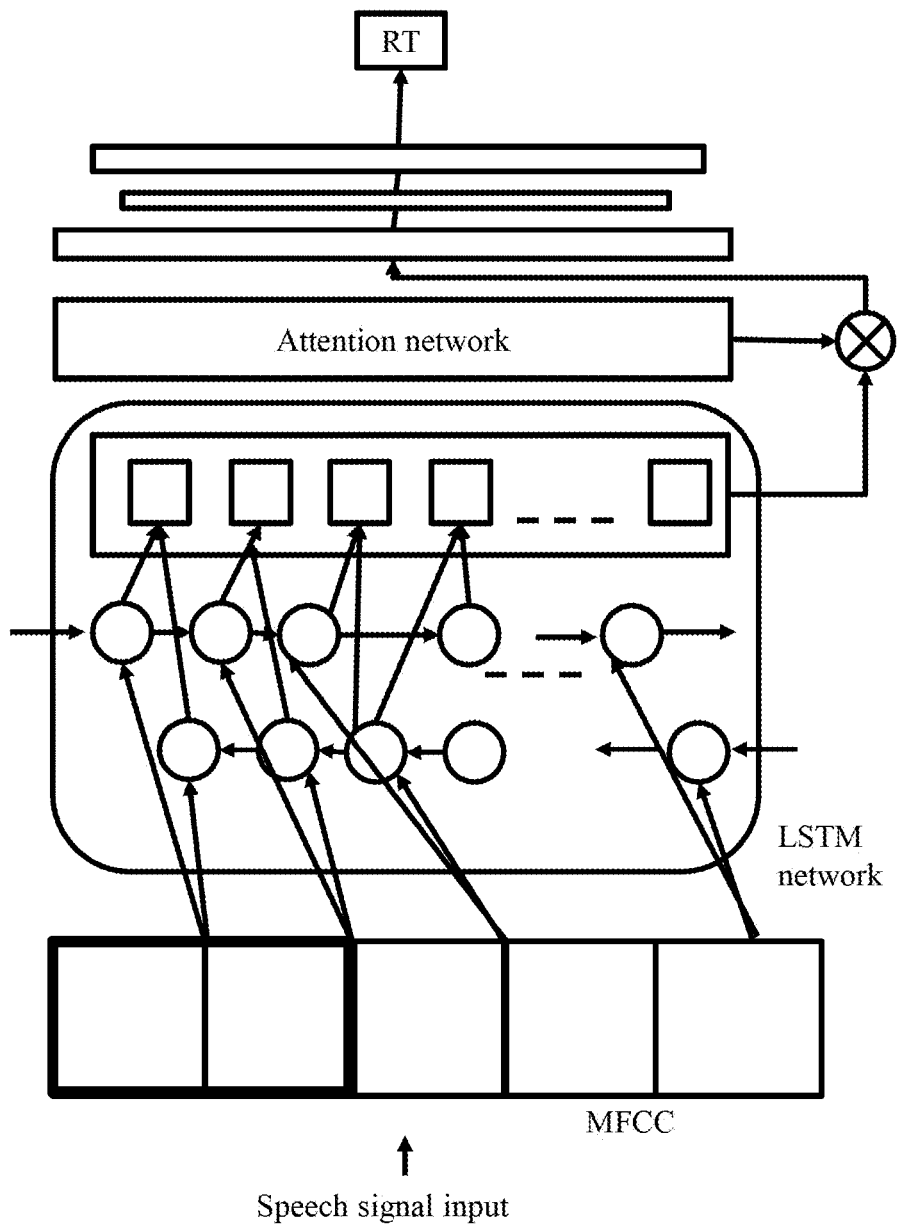
FIG. 3 illustrates a head motion generating network, used by the system of FIG. 1, in accordance with some embodiments of the present disclosure.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the process of animation being performed by the system 100. The system 100 can be implemented in a variety of ways as per requirements. One mode of implementation of the system of FIG. 1 is depicted in FIG. 2. Further, a detailed architecture of a head motion generating network used by the system 100 to generate head motion data of the user, by processing the speech signal input, is depicted in FIG. 3. Various steps involved in the process of generating the animation by the system 100 are explained with description of FIGS. 4 and 5. All the steps in FIGS. 2 and 3 are explained with reference to the system of FIG. 1.

FIG. 2 is a block diagram depicting functional implementation of the system of FIG. 1, according to some embodiments of the present disclosure. The architecture in FIG. 2 includes an MFCC (Mel-frequency cepstral coefficients) extraction module, a face motion generation module, a head motion generation module, a retargeting module, and a texture generation module. Functions of each of these modules are explained hereafter, but may not be in the order in which the steps are executed by the system 100.

The MFCC extraction module collects input speech signal from the subject as input, and generates Mel-frequency cepstral coefficients parameters by processing the speech signal using state of the art MFCC feature extraction approach. Input to the system 100 may be a video of the subject speaking, and the speech signal may be extracted from the video, by the system 100. At this step, the system 100 may split the video into a plurality of video frames, and then extract the speech signals from each of the video frames. The MFCC features extracted are then fed as input to the face motion generation module, and the head motion generation module.

The face motion generation module is configured to process the speech signal input i.e. the MFCC parameters extracted from the speech signal, and identifies facial movement data pertaining to the subject. The facial movement data may include information such as but not limited to lip synchronization with input speech signal, natural eye blink (eye blinks), and eye brow movement. The system 100 may use any known suitable approach to identify the facial movement data. One such technique is detailed in the Indian patent application 202021032794, filed on 30 of Jul. 2020.

The head motion generation module is configured to generate head movement data pertaining to the subject, by processing the speech signal, using the method elaborated in description of FIG. 4. The head motion generation module may use a Long-Short Team Memory (LSTM) based head motion generation network to process the speech signal to generate the head movement data. The LSTM based architecture is depicted in FIG. 3, and working of this head motion generation network is explained with description of FIG. 4.

The retargeting module is configured to collect a plurality of 3-Dimensional (3D) canonical (or mean) facial landmarks generated from the speech signal, and a plurality of subject specific 3-Dimensional (3D) landmarks as input. The retargeting module then retargets the 3D canonical facial landmarks to the subject specific 3D landmarks, to generate 3D motion induced subject specific frontal facial landmarks.

The texture generation module is configured to collect information on the 3D motion induced subject specific frontal facial landmarks and the head movement data as inputs, and generate subject-specific motion induced landmarks as output. The texture generation module further encodes the motion induced subject specific frontal facial landmarks to a latent vector. The texture generation module then decodes the latent vector to generate an image face with motion, of the subject. The face image with motion, forms the animated face of the subject.

Figure 4A:
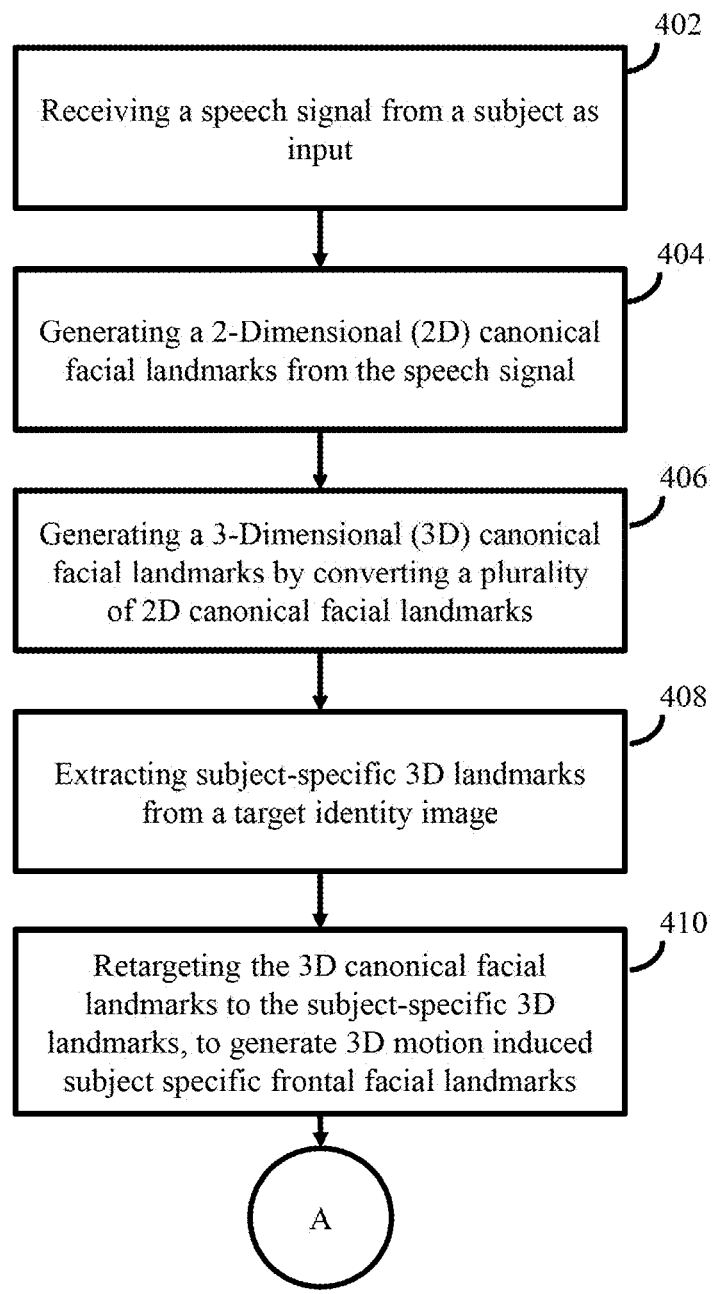
FIGS. 4A and 4B (collectively referred to as FIG. 4) is a flow diagram depicting steps involved in the process of generating the animation, using the system of FIG. 1, according to some embodiments of the present disclosure.
Figure 4B:
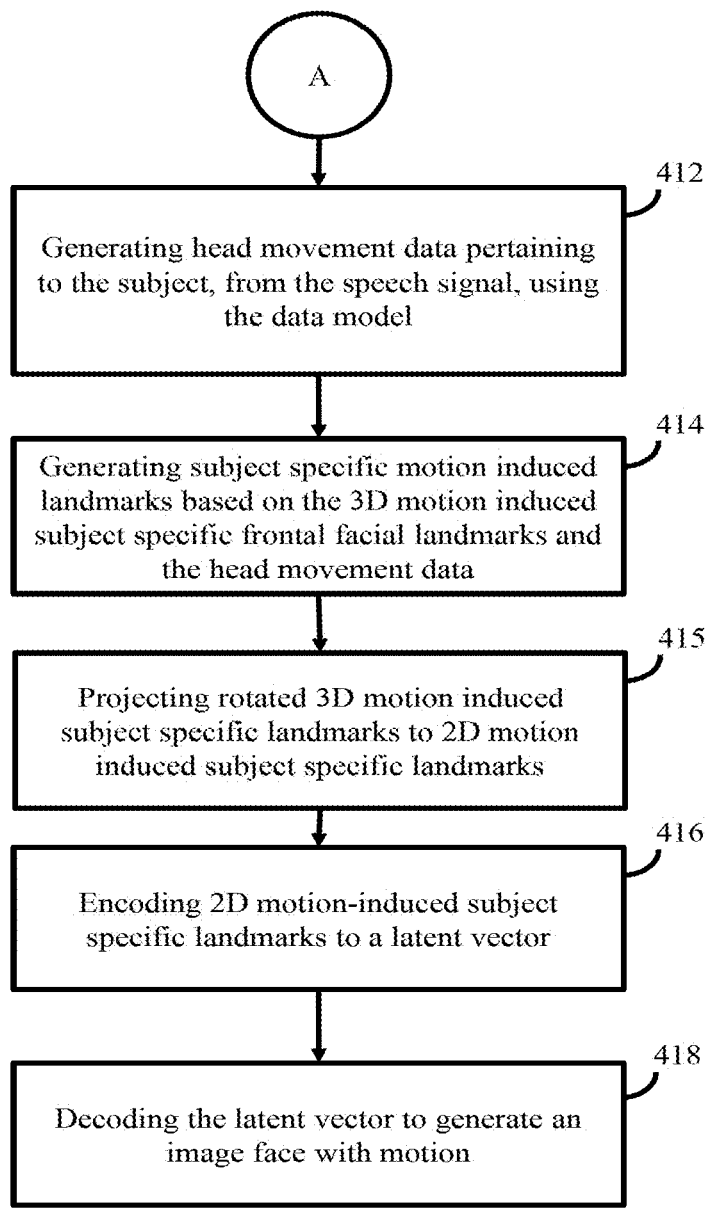

FIGS. 4A and 4B (collectively referred to as FIG. 4) is a flow diagram depicting steps involved in the process of generating the animation, using the system of FIG. 1, according to some embodiments of the present disclosure. The system 100 is configured to generate an animation output, which captures information on head movement of a subject, in addition to facial movement information, so that the generated animation is more similar to reality/ground truth. In an embodiment, the system 100 uses a data model to determine the facial movement data from the speech signal. In a training phase, the system 100 trains the data model using different speech signal inputs, such that trained model generated by virtue of the training process can be used to determine/generate the facial movement data for a given input speech signal. Steps in the method of extracting/generating various facial movement data as disclosed herein can be used during the training phase as well.

At step 402, the system 100 receives/collects a speech signal from a subject, as input. In various embodiments, the speech signal may be of any length or may be of a fixed length as pre-configured with the system 100. Further, by processing the speech signal, the system 100 extracts a plurality of DeepSpeech features from the speech signal. The DeepSpeech features include features of audio $a_t$. Further noise $z_t$ is sampled from a normal distribution using predefined mean and standard deviation. At step 404, the system 100 generates a plurality of 2-Dimensional (2D) canonical facial landmarks by processing the DeepSpeech features and the noise input. The 2D canonical facial landmarks pertain to the facial movement data (lip synchronization with input speech signal, eye blinks, and eyebrow movement) of the subject. Further at step 406, the system 100 converts the 2D canonical facial landmarks to corresponding 3D canonical facial landmarks, based on a plurality of camera parameters computed from a plurality of 2D-3D canonical landmarks correspondences.

The generated 3D canonical facial landmarks $\hat{x}_t \in \mathcal{R}^{68*3}$ with the speech-induced lip motions and eye motions $\hat{x}_{1:T} = f_{FM}(a_{1:T}, z_{1:T}|\theta_M)$, where $\theta_M$ denotes trainable parameters used for generating the facial landmarks. As DeepSpeech predicts probability of phonemes present in the speech and is robust to noise and speaker variations in the in the audio, by using the DeepSpeech, the system 100 is able to achieve invariance to these factors. The system 100 may use a Generative Adversarial Network (GAN) network for generating the facial movement data by processing the speech signal input. A generator module of the GAN network includes an LSTM network and an encoder-decoder network which takes noise and an audio feature window (the speech signal is split to multiple time windows, and each one is referred to as the 'audio feature window') respectively and generates predictions with respect to displacement of lips and eye on the 2D canonical landmarks and at step 406 the 2D canonical landmarks are converted to 3D canonical landmarks. The system 100 may determine the lip movements with respect to the speech signal, by learning lip positions using a supervision on landmark positions $L_{sup} = \|x_t - \hat{x}_t\|_2^2$, direction of movement of landmarks $L_{vel}$, and adversarial loss $L_{adv}$. The system 100 may use MMD Loss $L_E$ so as to supervise the eye movements. The system 100 may use a regularization loss $L_{temp}$ to ensure smoothness in predicted landmarks in consecutive frames.

Overall loss for training the data model for generating recommendations on the facial movement data is determined by the system 100 as:

$$L_{FM} = \lambda_{sup}L_{sup} + \lambda_{vel}L_{vel} + \lambda_{temp}L_{temp} + E L_E + \lambda_{adv}L_{adv} \quad (1)$$

Where, $$L_{temp} = \|x_t - \hat{x}_{t-1}\|_2^2 \quad (2)$$

$$L_{vel} = \|\overrightarrow{\Delta x_t} - \overrightarrow{\Delta \hat{x}_t}\|_2^2 \quad (3)$$

Where, $$\overrightarrow{\Delta x_t} = 1, \text{ if } x_{t+1} > x_t, \text{ else } 0 \quad (4)$$

$$L_{adv} = E_{x_t}[\log(D_L(x_t))] + E_{a_{t,z_t}}[\log(1 - D_L(G_L(x_p, a_t)))] \quad (4)$$

Where $x_p$ is neutral canonical landmark.

At step 408, the system 100 extracts subject-specific 3D landmarks from a target identity image of the subject. The target identity image is an image of the subject, from which the system 100 can extract unique facial characteristics of the user, as the subject-specific landmarks. Further at step 410, the system 100 retargets the 3D canonical face landmarks generated at step 406 to the subject specific 3D landmarks, so as to generate facial motion-induced subject-specific frontal 3D landmarks.

Further, at step 412, the system 100 generates head movement data pertaining to the subject, by processing the speech signal. In an embodiment, the system 100 uses the GAN based architecture as depicted in FIG. 3 to process the speech signal and generate the head movement data. A generator network $f_{HM}$ of the GAN based the architecture is a self attention based LSTM architecture.

In order to generate the head movement data, the system 100 collects the MFCC features of the speech signal as input. The $f_{HM}$ determines an attention score $A_{1:T}$ for each of a plurality of audio windows, in an input sequence $a_{1:T}$. The $f_{HM}$ then determines a sequence of rotation (in quaternion space) and translation $\mathcal{R} | \mathcal{T} \in \mathcal{R}^7$ with respect to the frontal 3D canonical face. $\mathcal{R} | \mathcal{T}_{1:T} = f_{HM}(a_{1:T}|\theta_H)$; $\theta_H$, are the learnable parameters of the $f_{HM}$ being used by the system 100, for each of the plurality of audio windows in which the determined attention score is exceeding a threshold of attention score, using the plurality of MFCC features, wherein the sequence of rotation and translation parameters form a head pose of the subject. The $f_{HM}$ then generates a sequence of rotated 3D motion-induced subject-specific landmarks, by applying the determined sequence of rotation and translation parameters with respect to the frontal 3D canonical face, on the 3D motion-induced subject-specific frontal facial landmarks for each of the plurality of frames. The head pose $(\hat{R}|\hat{T}_t)$ of the subject, and is expressed as:

$$\hat{R}|\hat{T}_t = A_t * \tilde{R}|\tilde{T}_t + (1 - A_t) * R|T_N \quad (5)$$

Here, $A_t$ represents the attention. The high value of $A_t$ indicating a coherent speech in the input speech signal. For audio frames in which the attention score is less than a threshold of attention score, head of the subject remains at a neutral position with pose $R|T_N$. During training of the data model, the determined head pose is given as input to a discriminator of the $f_{HM}$. The discriminator determines the head pose as one or 'real or fake', in comparison with a ground truth head pose of the subject. This feedback (real or fake) is further used to improve the performance of the generator and helps to generate realistic head motions. The system 100 defines losses defined for training the data model as:

$$L_{HM} = \lambda_{rot}L_{rot} + \lambda_{Hadv}L_{Hadv} + \lambda_{Atemp}L_{Atemp} \quad (6)$$

Where, $L_{rot}$ is a supervised $L_2$ loss between the head pose determined by the system and the ground truth head pose, for a speech signal input.

$L_{Atemp}$ is regularization loss, $\|\hat{A}_t - \hat{A}_{t-1}\|_2^2$ over A number of consecutive frames to ensure smoothness in predicted head motion.

Discriminator and Generator losses are defined by the system 100 as:

$$L_D = E_{x \sim P_r}[D(x)] - E_{z \sim P_g}[D(G(z))] \quad (7)$$

$$L_G = -E_{z \sim P_g}[D(G(z))] \quad (8)$$

$P_r$ and $P_g$ are distribution of head pose sequences with ground truth $R|T_t$ and predicted rotation and translations $\hat{R}|\hat{T}_t$ respectively. Weights of the discriminator are clipped within a range of [−0.1, 0.1], and the discriminator is updated n times (for example, value of 'n' may be 5, as configured with the system 100) for every single update of the generator.

After generating the head movement data, at step 414, the system 100 generates subject specific motion induced landmarks based on the 3D motion induced subject specific frontal facial landmarks and the head movement data. The system 100 collects the 3D motion induced subject specific frontal facial landmarks and the head movement data as inputs. The system 100 then combines the facial motion-induced subject-specific frontal 3D landmarks and the head movement data to generate the subject specific motion induced landmarks. At this step, the system 100 retargets the facial motion-induced subject-specific frontal 3D landmarks and the head movement data onto the subject specific landmarks. At step 415, system 100 projects the rotated and translated 3D motion-induced subject-specific landmarks to 2D motion-induced subject-specific landmarks, using the camera parameters computed from the correspondences between 2D-3D person specific facial landmarks extracted from the input target identity image using a state-of-the art algorithm for facial landmark detection. A texture generation network $f_{TN}$ of the GAN network includes a landmark encoder (LE), a texture encoder (TE), and a Texture Decoder (TD). At step 416, the LE encodes the subject specific motion induced landmarks to a latent vector e. Further at step 418, the TD decodes the latent vector e to generate an image face with emotion, of the subject. The system 100 may use Adaptive Instance Normalization (AIN) to update the latent vector e by activations of last layer of TE. The TE may encode texture information of the subject by taking 'n' number of identity images and corresponding landmark images, concatenated channel-wise. The system 100 $L_T$) as:

$$L_T = \lambda_{rec} L_{rec} + \lambda_{ugg} L_{ugg} + \lambda_{T_{adv}} L_{T_{adv}} \quad (9)$$

Where, $$L_{rec} = \|I - \hat{I}\|_2^2 \quad (10)$$

$$L_{ugg} = \alpha_1 \|VGG19(I) - VGG19(\hat{I})\|_2^2 + \alpha_2 \|VGGFace(I) - VGGFace(\hat{I})\|_2^2 \quad (11)$$

$$L_{T_{adv}} = E_{I_t}[\log(D_T(I_n, I_t^*))] + E_{x_t}[\log(1 - D_T(I_n, G_T(x_t, I_n)))] \quad (12)$$

The system 100 may then provide the generated animation (i.e. the image face with motion) to the user, using one or more suitable interfaces. In an embodiment, the steps in method 400 may be performed in the same order as depicted, or in any alternate order that is technically feasible.

Figure 5:
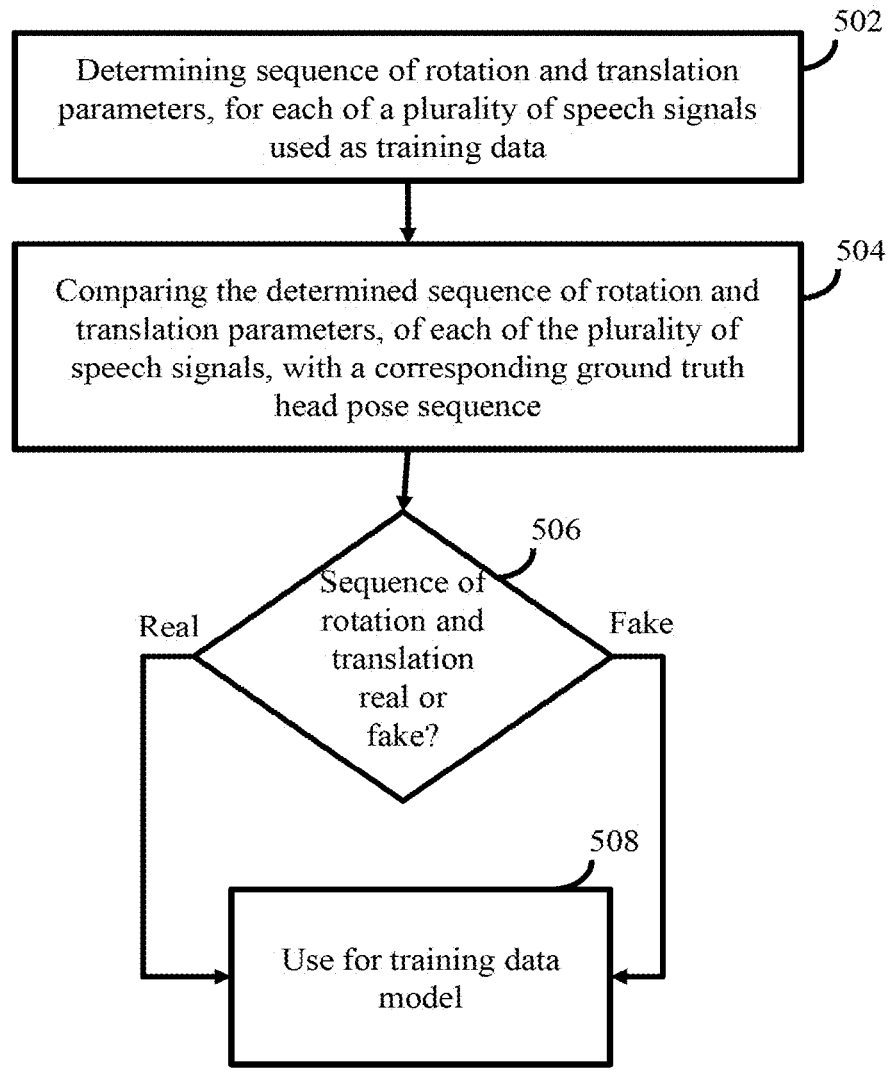
FIG. 5 is a flow diagram depicting steps involved in the process of training a data model for determining the head movement data, using the system of FIG. 1, according to some embodiments of the present disclosure.

FIG. 5 is a flow diagram depicting steps involved in the process of training a data model for determining the head movement data, using the system of FIG. 1, according to some embodiments of the present disclosure. The data model is generated by using a plurality of speech signals as training data. For each speech signal, at step 502, the system 100 extracts the sequence of rotation and translation parameters representing ground truth head pose of corresponding subject from the ground truth videos of training dataset. From speech signal input, the system 100 generates the sequence of rotation and translation parameters using the approach elaborated in FIG. 4 (412). Further, at step 504, the system 100 compares the determined sequence of rotation and translation parameters with a corresponding ground truth head pose sequence. If extent of match between the determined sequence of rotation and translation parameters with the corresponding ground truth head pose sequence is at least equal to a threshold score, the determined sequence of rotation and translation parameters is classified as 'real' at step 506, and if the extent of match between the determined sequence of rotation and translation parameters with the corresponding ground truth head pose sequence is below the threshold score, the determined sequence of rotation and translation parameters is classified as 'fake'. Information on the classification of each of the sequence of rotation and translation parameters as real or fake is used for training the data model at step 508. In an embodiment, the head movement data generated by the system 100 for any real-time speech signal input may be used for updating the data model, by the system 100. The system 100 trains the data model using the information of the sequence of ground truth rotation and translation parameters of head pose corresponding to each of the plurality of the audio windows of the speech signal of being real or fake by updating the training data model to produce realistic head pose sequence. In an embodiment, the steps in method 500 may be performed in the same order as depicted, or in any alternate order that is technically feasible.

Figure 6A:
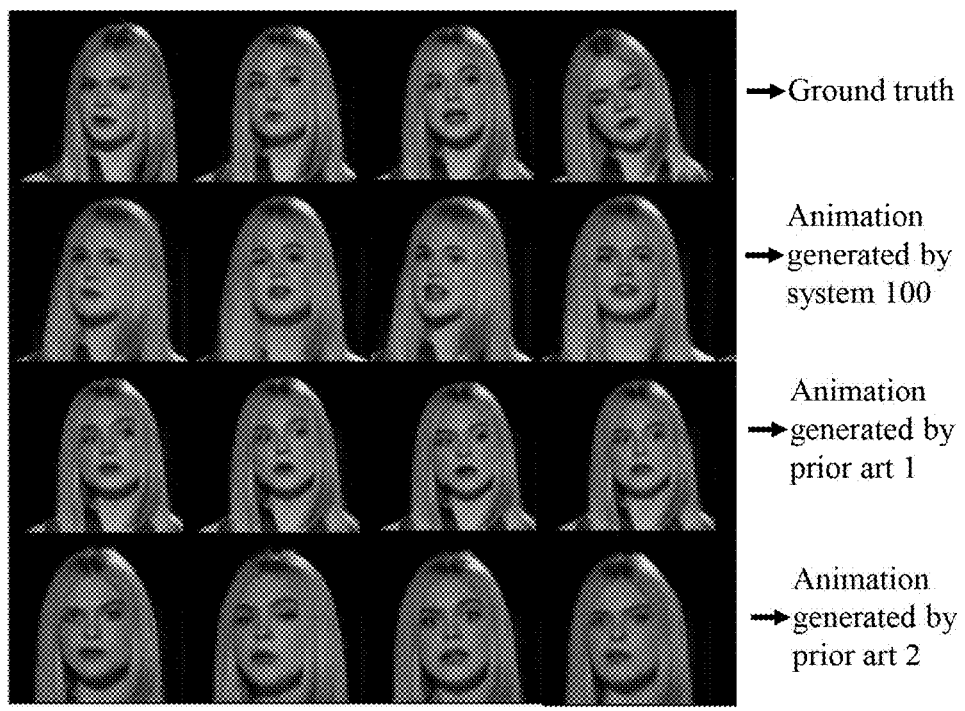
FIGS. 6A and 6B are examples illustrating comparison of animations generated by the system of FIG. 1 with the animations generated by a plurality of state of the art systems, in accordance with some embodiments of the present disclosure.
Figure 6B:
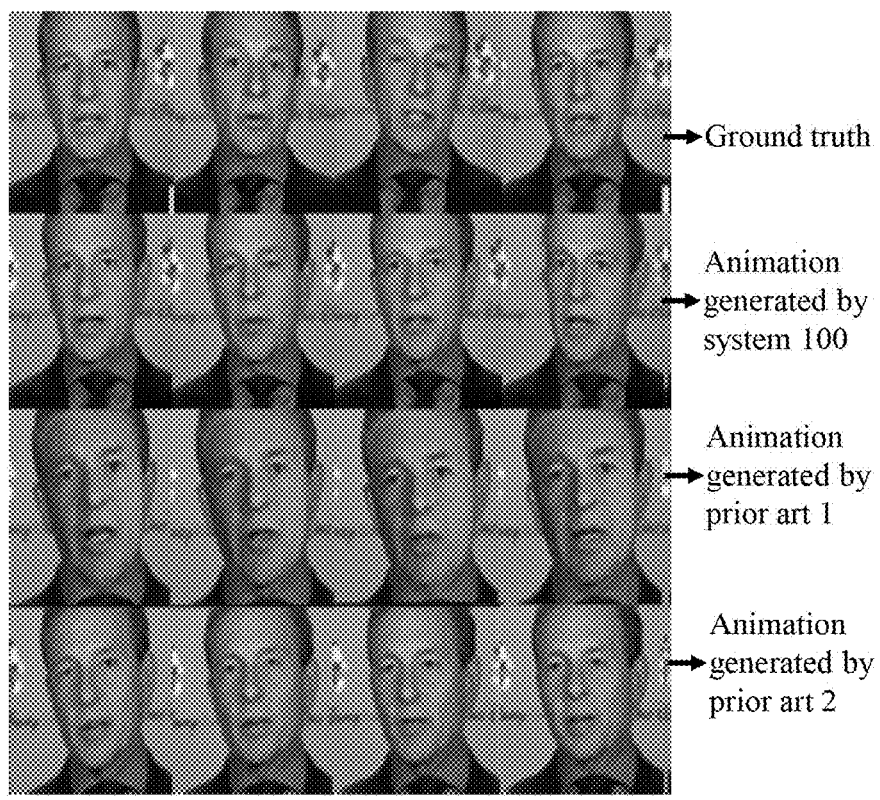

FIGS. 6A and 6B are examples illustrating comparison of animations generated by the system of FIG. 1 with the animations generated by a plurality of state of the art systems, in accordance with some embodiments of the present disclosure.

As evident from the images, the results generated by prior art reference 1 (i.e. Chen et al.) and prior art reference 2 (i.e. Yi et al.) fail to take into consideration the head movements of the subjects while they are speaking. As a result, though the lip movements and eye ball movements form the animations generated, the subject's head remains in same position throughout the speech, which is inaccurate in comparison with the ground truth image. However, the animation generated by the system 100 considers the head movement data as well, in addition to the lip movement and eyeball movement data, and as a result, is more similar to the ground truth images.

Experimental Results:

During experiments conducted the system 100 was trained on training split of VoxCeleb1 (Nagrani, Chung, and Zisserman 2017) and evaluated on test split of VoxCeleb 1, VoxCeleb2 (Nagrani, Chung, and Zisserman 2018), LRS-TED, (Afouras, Chung, and Zisserman 2018) datasets. VoxCeleb1 contained over 100,000 utterances from interviews of 1,251 celebrities, VoxCeleb2 contains 1 million utterances of 6,112 celebrities and LRS-TED contains over 400 hours of video, extracted from 5594 TED videos. The LRS and VoxCeleb2 datasets had a wider variety and range of head movements.

During the course of the experiments, a comparative study of results generated by the system 100 with some of the recent state-of the-art methods for facial animation with predictive head motions Chen et al. (2020); Yi et al. (2020), and a method for generating facial animation from ground truth landmarks Wang et al. (2019) was conducted. Wang et al. (2019) was trained on Voxceleb1. For Chen et al. (2020);

Yi et al. (2020) the publicly available pre-trained models were fine-tuned on the respective datasets (VoxCeleb1, VoxCeleb2, and LRS-TED) for qualitative and quantitative evaluation. Yi et al. (2020) took a sample video of 300 frames for an unknown subject for fine-tuning. For evaluating this method 20, 40, and 9 subjects were selected from VoxCeleb, VoxCeleb2 and LRS-TED respectively, with videos having at least 300 frames.

Performance Metrics:

For evaluating the quality of head motion, Canonical Correlation Analysis (CCA, per video) as proposed in (Lu and Shimodaira 2020) and the Wasserstein Distance (HS) as proposed in (Yi et al. 2020) between the distribution of head poses in real and generated videos, were used. Sadoughi and Busso (2016) had shown a high correlation ($p=0.77$) between local head motions (head motion within a short time duration) with the prosodic features of the audio in real videos. Hence, local CCA can reveal the correlation of predicted head motion with audio. For measuring the degree of identity preservation in generated videos, CSIM, i.e Cosine Similarity of ArcFace features (Deng et al. 2019), and Euclidean distance between Facenet (Schroff, Kalenichenko, and Philbin 2015) features calculated between each predicted frame and the first frame of the ground-truth video, were used. To evaluate the texture quality, FID (Heusel et al. 2017), CPBD (Narvekar and Karam 2009), and SSIM (Wang et al. 2004) for quantifying the fidelity, sharpness and structural similarity of the synthesized images respectively, were used. For measuring correctness of the lip movements Lip landmark Distances (LMD) as proposed in Chen et al. (2018) was used.

Results:

1. Qualitative Results:

Results of the system 100 in comparison with Chen et al. 2020 (Prior art reference 1) and Yi et al. 2020 (Prior art reference 2) are depicted in FIGS. 6A and 6B. The system 100 was able to generate head movements and eye blink, using only 32 images of a target person (i.e. subject). Yi et al. (2020) is not able to produce significant motion in head if the driving video does not contain any head motion. Chen et al. (2020) predicts head poses taking initial 3 secs of sample head poses of the target along with the speech input. The head poses predicted by Chen et al. (2020) may be different from the initial ground truth head poses as they are also dependent on current speech input, but the generated facial texture can fail to preserve the identity information while generating head movements (FIG. 6A, fourth row of first example).

Quantitative Results:

R3 takes a ground-truth landmark input instead of audio/speech signal. Head poses predicted by R2 have been used for computing head pose metrics CCA and HS, but ground truth landmarks used for generating the facial texture are evaluated by texture quality metrics CSIM, FaceNet, FID, SSIM, and CPBD. R2 needed videos of length of at least 3 seconds for head pose generation, but videos of LRS-TED being very short, CCA and HS could not be computed for R2. Results were evaluated using $K=32$ for R2, R3, and S1.

Table. 1 shows the quantitative comparisons with the state-of-the-art methods. The system 100 could produce realistic head motions with higher canonical correlation with the head motions in real videos as compared to the state-of-the-art methods. Also it should be noted that, the system 100 generated head motion/movements only from the speech input unlike Yi et al. (2020) and Chen et al. (2020) who need sample speech from the test subject with ground-truth head poses (extracted from the sample video input). Yi et al. (2020) did not generate the entire frame, instead they synthesized the background from the ground-truth sample video. But the system 100 generated the entire frame of the video and hence the CSIM metric was lower for the method adopted by the system 100, in comparison. Owing to a divide and conquer approach used by the system 100 for independent motion and texture learning, identity of the target subject could be retained with better quality texture compared to the state-of-the art methods. Moreover, due to meta-learning, the system 100 could adapt to any unknown face quickly in test time by using only 32 images. The system 100 was also able to achieve better lip sync than that of state-of-the-art methods because of the use of noise, accent variant DeepSpeech features as shown in Table 1. The method used by the system 100 could also generate realistic eye blinks (Sinha, Biswas, and Bhowmick 2020; Vougioukas, Petridis, and Pantic 2019) with an average of 0.352 blinks/sec.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those

TABLE 1

| Dataset | Methods | CCA↑ | HS↑ | CSIM↑ | faceNet↓ | FID↓ | SSIM↑ | CPBD↑ | LMD↓ |
|---|---|---|---|---|---|---|---|---|---|
| VoxCeleb1 | R1 | 0.660 | 0.767 | 0.713 | 0.59 | 65.9 | 0.52 | 0.407 | 3.385 |
|  | R2 | 0.814 | 0.90 | 0.7 | 0.61 | 120.2 | 0.38 | 0.19 | NA |
|  | R3 | NA | NA | 0.534 | 0.63 | 66.34 | 0.442 | 0.202 | NA |
|  | S1 | 0.846 | 0.93 | 0.79 | 0.41 | 34.6 | 0.85 | 0.39 | 2.076 |
| VoxCeleb2 | R1 | 0.658 | 0.73 | 0.75 | 0.6 | 110.4 | 0.38 | 0.138 | 4.31 |
|  | R2 | 0.548 | 0.745 | 0.42 | 0.67 | 47 | 0.74 | 0.199 | 3.37 |
|  | R3 | NA | NA | 0.60 | 0.646 | 41.4 | 0.73 | 0.159 | NA |
|  | S1 | 0.710 | 0.808 | 0.70 | 0.47 | 38.7 | 0.84 | 0.202 | 2.611 |
| LRS-TED | R1 | 0.883 | 0.825 | 0.62 | 0.744 | 78.97 | 0.48 | 0.180 | 3.713 |
|  | R2 | NA | NA | 0.41 | 0.69 | 324 | 0.76 | 0.2 | NA |
|  | R3 | NA | NA | 0.40 | 0.783 | 132 | 0.69 | 0.165 | NA |
|  | S1 | 0.891 | 0.849 | 0.68 | 0.56 | 112 | 0.83 | 0.37 | 2.724 |

R1 (Reference 1) is Yi et al
R2 (Reference 2) is Chen et al
R3 (Reference 3) is Wang et al
S1 is the method used by system 100 described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method of generating facial animations, the method comprising:
    receiving a speech signal from a subject as input, via one or more hardware processors; generating a plurality of 2-Dimensional (2D) canonical facial landmarks from the speech signal, using a data model, via the one or more hardware processors, wherein the 2D facial landmarks pertain to facial movement data of the subject, wherein the facial movement data comprises lip synchronization with the input speech signal, natural eye blinks, and eye brow movement;
    generating a plurality of 3-Dimensional (3D) canonical facial landmarks by converting the plurality of 2D facial landmarks, using a plurality of camera parameters computed from a plurality of 2D-3D canonical landmark correspondences, via the one or more hardware processors;
    extracting a plurality of subject-specific 3D landmarks from a target identity image of the subject, via the one or more hardware processors;
    retargeting the plurality of 3D canonical facial landmarks to the plurality of subject-specific 3D landmarks via the one or more hardware processors, to generate a plurality of facial motion-induced subject-specific frontal 3D landmarks;
    generating head movement data pertaining to the subject, from the input speech signal, using the data model, by encoding 2D motion-induced subject-specific landmarks to a latent vector, via the one or more hardware processors; and
    decoding the latent vector to generate an image face with motion, via the one or more hardware processors.

2. The method as claimed in claim 1, wherein generating the head movement data using the data model comprises:
    extracting Mel-frequency cepstral coefficients (MFCC) features for each of a plurality of audio windows of the speech signal corresponding to each of a plurality of video frames;
    determining an attention score for each of the plurality of audio windows;
    determining using the plurality of MFCC features, a sequence of rotation and translation parameters with respect to a frontal 3D canonical face, for each of the plurality of audio windows for which the determined attention score is exceeding a threshold of attention score, wherein the sequence of rotation and translation parameters form a head pose of the subject;
    generating a sequence of subject-specific 3D landmarks induced with head motion, by applying the determined sequence of rotation and translation parameters with respect to the frontal 3D canonical face, on the facial motion-induced subject-specific frontal 3D landmarks, for each of the plurality of video frames; and
    projecting the rotated and translated 3D motion-induced subject-specific landmarks to the 2D motion-induced subject-specific landmarks via the one or more hardware processors, using the camera parameters computed from the correspondences between 2D-3D person specific facial landmarks extracted from the input target identity image, wherein the 2D motion-induced subject-specific landmarks form the head movement data pertaining to the subject.

3. The method as claimed in claim 1, wherein the data model is trained to generate the head movement data for any speech signal, wherein training the data model comprises:
    determining the sequence of rotation and translation parameters forming the head pose of the subject, for each of a plurality of audio windows of each of the speech signals used as training data, via the one or more hardware processors;
    comparing the sequence of rotation and translation parameters determined for each of the plurality audio windows of speech signals with a corresponding ground truth head pose sequence during training, via the one or more hardware processors;
    determining the sequence of rotation and translation parameters of each of the plurality of speech signals as one of real or fake, based on the comparison with the corresponding ground truth head pose sequence, via the one or more hardware processors; and
    training the data model using information of the sequence of ground truth rotation and translation parameters of head pose corresponding to each of the plurality of the audio windows of the speech signal to produce realistic head pose sequence, via the one or more hardware processors.

4. A system for generating facial animations, the system comprising:
    a memory storing instructions;
    one or more communication interfaces; and
    one or more hardware processors coupled to the memory via the one or more communication interfaces, wherein the one or more hardware processors are configured by the instructions to:
        receive a speech signal from a subject as input;
        generate a plurality of 2-Dimensional (2D) canonical facial landmarks from the speech signal, using a data model, wherein the 2D facial landmarks pertain to facial movement data of the subject, wherein the facial movement data comprises lip synchronization with the input speech signal, natural eye blinks, and eye brow movement;

generate a plurality of 3-Dimensional (3D) canonical facial landmarks by converting the plurality of 2D facial landmarks, using a plurality of camera parameters computed from a plurality of 2D-3D canonical landmark correspondences;

extract a plurality of subject-specific 3D landmarks from a target identity image of the subject;

retarget the plurality of 3D canonical facial landmarks to the plurality of subject-specific 3D landmarks, to generate a plurality of facial motion-induced subject-specific frontal 3D landmarks;

generate head movement data pertaining to the subject, from the input speech signal, using the data model to encode 2D motion-induced subject-specific landmarks to a latent vector; and decode the latent vector to generate an image face with motion.

5. The system as claimed in claim 4, wherein the system generates the head movement data by:

extracting Mel-frequency cepstral coefficients (MFCC) features for each of a plurality of audio windows of the speech signal corresponding to each of a plurality of video frames;

determining an attention score for each of the plurality of audio windows;

determining using the plurality of MFCC features, a sequence of rotation and translation parameters with respect to a frontal 3D canonical face, for each of the plurality of audio windows for which the determined attention score is exceeding a threshold of attention score, wherein the sequence of rotation and translation parameters form a head pose of the subject;

generating a sequence of subject-specific 3D landmarks induced with head motion, by applying the determined sequence of rotation and translation parameters with respect to the frontal 3D canonical face, on the facial motion-induced subject-specific frontal 3D landmarks, for each of the plurality of video frames; and projecting the rotated and translated 3D motion-induced subject-specific landmarks to the 2D motion-induced subject-specific landmarks via the one or more hardware processors, using the camera parameters computed from the correspondences between 2D-3D person specific facial landmarks extracted from the input target identity image, wherein the 2D motion-induced subject-specific landmarks form the head movement data pertaining to the subject.

6. The system as claimed in claim 4, wherein the system trains the data model to generate the head movement data for any speech signal, by:

determining the sequence of rotation and translation parameters forming the head pose of the subject, for each of a plurality of audio windows of each of the speech signals used as training data, via the one or more hardware processors;

comparing the sequence of rotation and translation parameters determined for each of the plurality audio windows of speech signals with a corresponding ground truth head pose sequence during training, via the one or more hardware processors;

determining the sequence of rotation and translation parameters of each of the plurality of speech signals as one of real or fake, based on the comparison with the corresponding ground truth head pose sequence, via the one or more hardware processors; and training the data model using information of the sequence of ground truth rotation and translation parameters of head pose corresponding to each of the plurality of the audio windows of the speech signal to produce realistic head pose sequence, via the one or more hardware processors.

7. A computer program product comprising a non-transitory computer readable medium having a computer readable instructions embodied therein, wherein the computer readable instructions, when executed, cause to perform generation of facial animations, by:

receiving a speech signal from a subject as input, via one or more hardware processors;

generating a plurality of 2-Dimensional (2D) canonical facial landmarks from the speech signal, using a data model, via the one or more hardware processors, wherein the 2D facial landmarks pertain to facial movement data of the subject, wherein the facial movement data comprises lip synchronization with the input speech signal, natural eye blinks, and eye brow movement;

generating a plurality of 3-Dimensional (3D) canonical facial landmarks by converting the plurality of 2D facial landmarks, using a plurality of camera parameters computed from a plurality of 2D-3D canonical landmark correspondences, via the one or more hardware processors;

extracting a plurality of subject-specific 3D landmarks from a target identity image of the subject, via the one or more hardware processors;

retargeting the plurality of 3D canonical facial landmarks to the plurality of subject-specific 3D landmarks via the one or more hardware processors, to generate a plurality of facial motion-induced subject-specific frontal 3D landmarks;

generating head movement data pertaining to the subject, from the input speech signal, using the data model, by encoding 2D motion-induced subject-specific landmarks, to a latent vector via the one or more hardware processors; and decoding the latent vector to generate an image face with motion, via the one or more hardware processors.

8. The computer program product as claimed in claim 7, wherein the computer program product generates the head movement data using the data model by:

extracting Mel-frequency cepstral coefficients (MFCC) features for each of a plurality of audio windows of the speech signal corresponding to each of a plurality of video frames;

determining an attention score for each of the plurality of audio windows;

determining using the plurality of MFCC features, a sequence of rotation and translation parameters with respect to a frontal 3D canonical face, for each of the plurality of audio windows for which the determined attention score is exceeding a threshold of attention score, wherein the sequence of rotation and translation parameters form a head pose of the subject;

generating a sequence of subject-specific 3D landmarks induced with head motion, by applying the determined sequence of rotation and translation parameters with respect to the frontal 3D canonical face, on the facial motion-induced subject-specific frontal 3D landmarks, for each of the plurality of video frames; and projecting the rotated and translated 3D motion-induced subject-specific landmarks to the 2D motion-induced subject-specific landmarks via the one or more hardware processors, using the camera parameters computed from the correspondences between 2D-3D person specific facial landmarks extracted from the input target identity image, wherein the 2D motion-induced subject-specific landmarks form the head movement data pertaining to the subject.

9. The computer program product as claimed in claim 7, wherein the data model is trained to generate the head movement data for any speech signal, wherein training the data model comprises:

determining the sequence of rotation and translation parameters forming the head pose of the subject, for each of a plurality of audio windows of each of the speech signals used as training data, via the one or more hardware processors;

comparing the sequence of rotation and translation parameters determined for each of the plurality audio windows of speech signals with a corresponding ground truth head pose sequence during training, via the one or more hardware processors;

determining the sequence of rotation and translation parameters of each of the plurality of speech signals as one of real or fake, based on the comparison with the corresponding ground truth head pose sequence, via the one or more hardware processors; and training the data model using information of the sequence of ground truth rotation and translation parameters of head pose corresponding to each of the plurality of the audio windows of the speech signal to produce realistic head pose sequence, via the one or more hardware processors.

* * * * *